United States Patent
Gomez et al.

(10) Patent No.: US 7,106,472 B2
(45) Date of Patent: Sep. 12, 2006

(54) PRINT DRIVER FOR AN EXTENDED PRINTING DEVICE

(75) Inventors: Jorge M. Gomez, San Diego, CA (US); Baljit S. Toor, Escondido, CA (US); Srinivas Bhakthavatsalam, San Diego, CA (US); Yonggui Mao, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 817 days.

(21) Appl. No.: 10/286,119

(22) Filed: Oct. 31, 2002

(65) Prior Publication Data

US 2004/0085572 A1 May 6, 2004

(51) Int. Cl.
*G06F 13/10* (2006.01)
*G06F 3/12* (2006.01)

(52) U.S. Cl. .................. 358/1.15; 719/327; 719/328

(58) Field of Classification Search .............. 358/1.15, 358/1.16, 1.14; 347/19; 710/8; 719/327, 719/328
See application file for complete search history.

(56) References Cited

U.S. PATENT DOCUMENTS

| | | | |
|---|---|---|---|
| 6,825,941 B1* | 11/2004 | Nguyen et al. | 358/1.15 |
| 6,969,139 B1* | 11/2005 | Lapstun et al. | 347/17 |
| 2002/0101600 A1* | 8/2002 | Sabbagh et al. | 358/1.13 |
| 2003/0200361 A1* | 10/2003 | Dogra et al. | 710/8 |
| 2003/0200427 A1* | 10/2003 | Kemp et al. | 713/1 |
| 2004/0070640 A1* | 4/2004 | Ferlitsch | 347/19 |

* cited by examiner

*Primary Examiner*—Kimberly Williams
*Assistant Examiner*—Scott Schlack (57) ABSTRACT

A print driver is provided for use in printing a document from a computing device to an extended printing device are provided, the extended printing device being based upon a base printing device. The print driver typically includes a base module configured to process at least one print operation involving printer-specific attributes of the extended printing device that are shared with the base printing device, and an interface module configured to enable an extended module to be added to the print driver to process at least one print operation involving printer-specific attributes of the extended printing device that are not shared with the base printing device.

9 Claims, 7 Drawing Sheets

PRINT DRIVER FOR AN EXTENDED PRINTING DEVICE

FIELD OF THE INVENTION

The invention relates generally to printing systems and methods, and more particularly to print drivers used therein.

BACKGROUND

Most modern computer systems typically employ print drivers to moderate communications between application programs and printers. Each print driver understands a set of specialized, private commands that control the operation of a particular type of printer, as well as a set of generic or public commands that are used to communicate with the application program. Thus, the print driver acts as a translator by converting generic commands received from an application program into specialized commands for its associated printer.

The generic commands of the print driver are typically defined by the operating system. These commands are publicly provided to manufacturers of printers for use in creating print drivers, and also to application developers for use in creating applications compatible with the operating system. The specialized commands are typically developed by the printer manufacturer, and are kept as a trade secret. They are included within the print driver only in binary form, which is incomprehensible to third parties, but which enables the private commands to be exchanged between the print driver and the printer.

One problem with known print drivers is that they are time consuming and costly to develop. Another problem is that the specialized commands are not customizable by third-party vendors and manufacturers because they are only distributed in binary, unrecognizable form. Thus, each time a third-party vendor or manufacturer desires to manufacture a different printing device, it must develop a new print driver, often wasting valuable time and resources.

SUMMARY

A print driver is provided for use in printing a document from a computing device to an extended printing device are provided, the extended printing device being based upon a base printing device. The print driver typically includes a base module configured to process at least one print operation involving printer-specific attributes of the extended printing device that are shared with the base printing device, and an interface module configured to enable an extended module to be added to the print driver to process at least one print operation involving printer-specific attributes of the extended printing device that are not shared with the base printing device.

DETAILED DESCRIPTION

Figure 1:
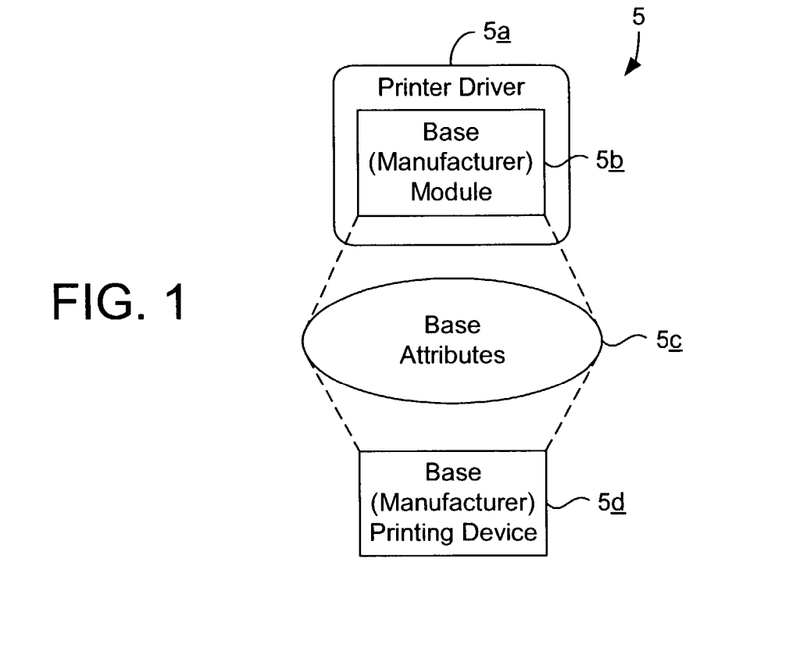
FIG. 1 is a schematic view of a base printing system according to one embodiment of the present invention.

Referring initially to FIG. 1, a base printing system is shown generally at 5. Base printing system 5 typically includes a base print driver 5a having a base module 5b containing data and functions configured to process one or more print operations related to a set of base attributes 5c of base printing device 5d. Since the components of system 5 are typically, but not always, made by a single manufacturer, they alternatively may be referred to as a manufacturer's print driver 5a, manufacturer's module 5b, manufacturer's printing device 5d, etc. In the same way, all other components referred to herein as "base" components should be understood to encompass manufacturer components, while components referred to below as "extended" components, should be understood to encompass third-party components. Typically, base module 5b is distributed to third parties only in object code form such that the data and functions may be used by third parties, but are kept secret from the third parties by the manufacturer.

Figure 2:
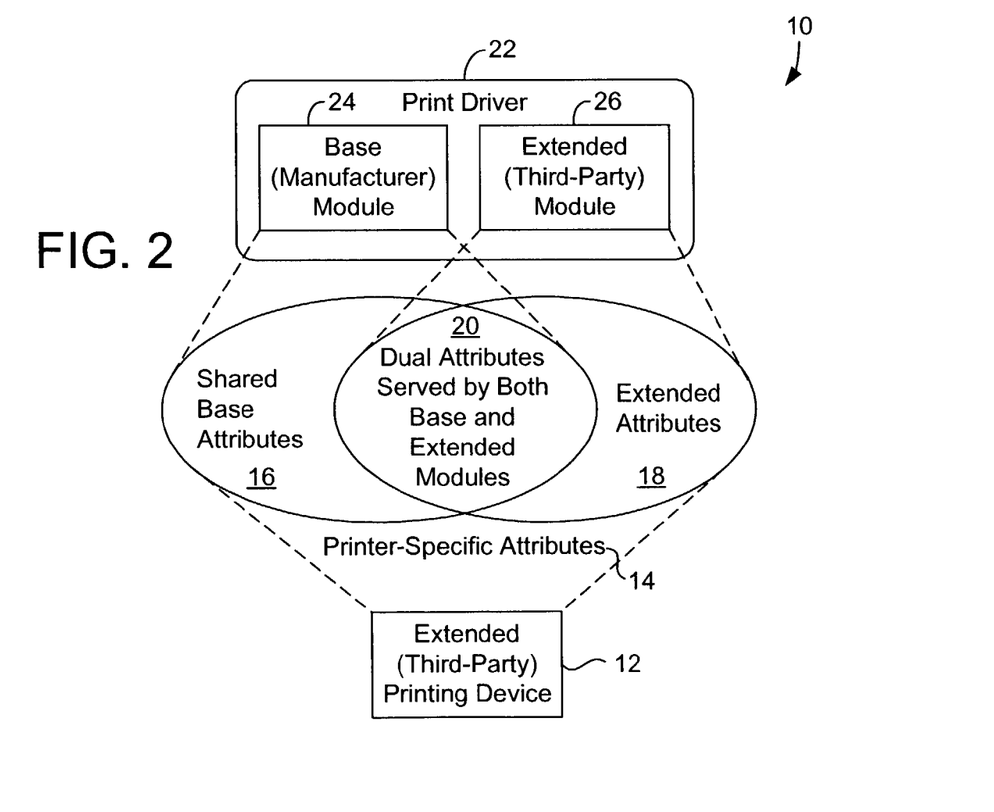
FIG. 2 is a schematic view of an extended printing system according to another embodiment of the present invention.

Referring now to FIG. 2, an extended printing system according to one embodiment of the present invention is shown generally at 10. Printing system 10 typically includes an extended printing device 12 which is based upon base printing device 5d. The extended printing device 12 includes printer-specific attributes 14 including base attributes 16 shared with the base printing device 5d, and extended attributes 18 not shared with the base printing device.

Printing system 10 also typically includes a print driver 22 having a base module 24 configured to process one or more print operations involving the base attributes 16, and an extended module 26 configured to process one or more print operations involving the extended attributes 28. Base attributes 16 may include a wide variety of attributes, such as user-adjustable print resolution settings (300, 600 dpi etc.) and non-user adjustable instructions for rendering graphics on the printer at each of these settings. Extended attributes 18 typically include attributes particular to those features of the extended printing device 12 which are not included in base printing device 5d. For example, the extended attributes may include a user-adjustable lamination setting (typically set to on or off), as well as non-user-adjustable instructions for applying the lamination to each printed page. Such a lamination feature may be useful, for example, where extended printing device 12 is an identification (ID) card printer configured to print and laminate identification cards. Where extended printing device 12 is a CD printer, an extended attribute may provide for printing directly onto compact discs utilizing a dynamically generated mask that cuts and/or shapes a print job to be printable on a compact disc.

Extended printing device 12 may further include dual attributes 20, which are processed by both base module 24 and extended module 26. One example of a dual attribute 20 for an extended printing device 12 with a lamination feature is a page PASSTHROUGH indication sent from the printing device to the computer, which indicates that a particular page of a multi-page print job has finished printing. Base module 24 may include functions controlling bidirectional communication between the printing device and computer, and thus may be able to pause other print operations temporarily while the extended module processes the PASSTHROUGH indication. Extended module 26 may include specific printer instructions regarding how to interpret the current lamination setting, and how to laminate the page itself. Because both the base and extended modules have roles to play in processing the PASSTHROUGH indication, it may be considered a dual attribute 20.

Typically, a manufacturer distributes base module 24 to a third-party manufacturer in object code form, and the third-party manufacturer incorporates base module 24 into extended print driver 22. To protect its own industrial secrets, third party manufacturer typically distributes the extended print driver 22 to users and other third parties with its own extended module 26 also in object code form, in addition to the base module 24.

Figure 3:
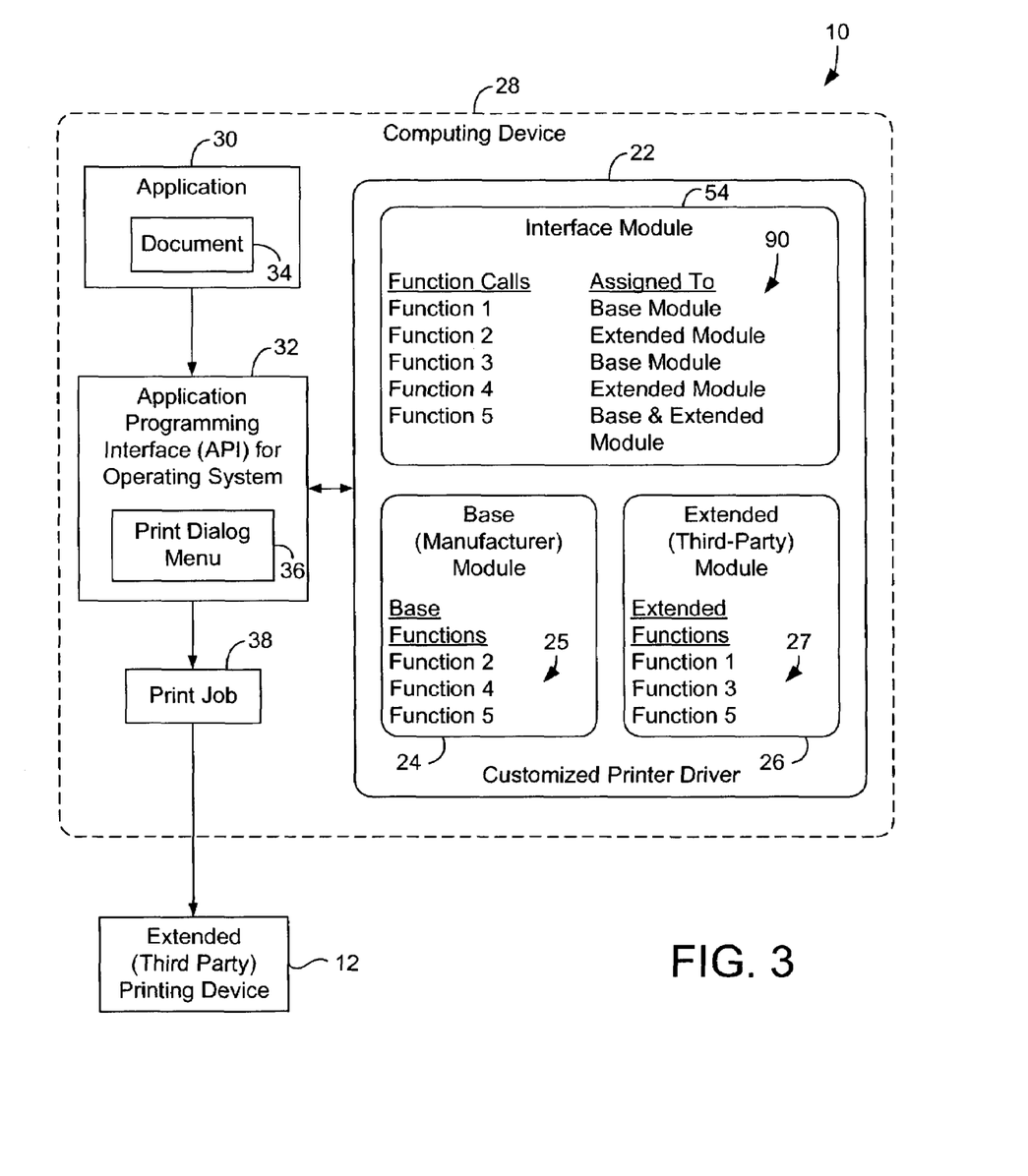
FIG. 3 is a schematic view of the printing system of FIG. 2, showing a computing device and various software components according to an embodiment of the present invention installed thereon.

As shown in FIG. 3, print driver 22 is typically installed on a computing device 28 of printing system 10. Computing device 28 also is configured to execute an application 30, including accessing features of an operating system via an application programming interface (API) 32. Print driver 22 is configured to respond to function calls from application 30 through API 32, and in turn process print operations related to printing a document 34 on extended printing device 12.

Figure 4:
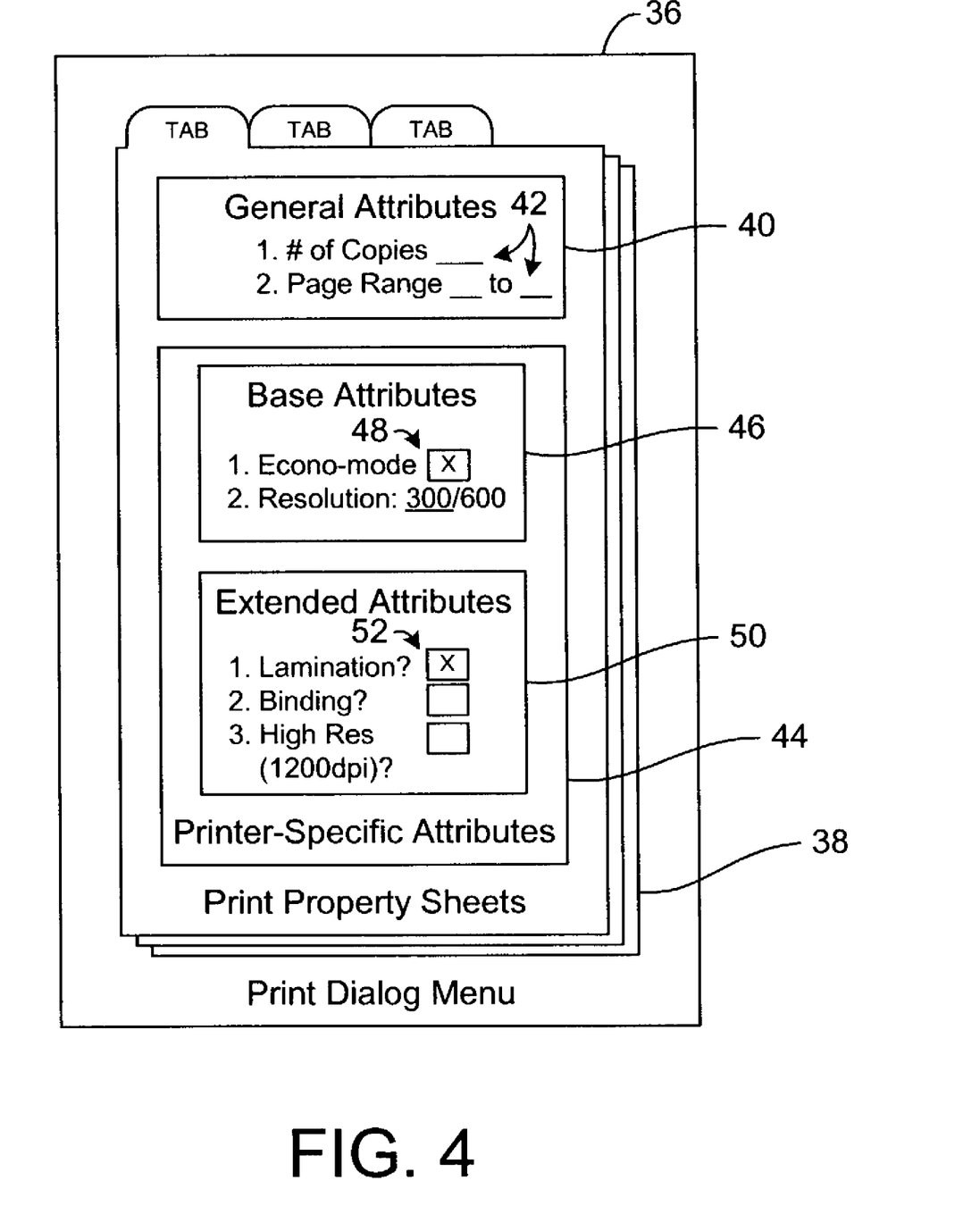
FIG. 4 is a schematic view of a print dialog menu according to an embodiment of the present invention associated with the system of FIG. 3.

Print driver 22 and API 32 are configured to produce a user interface such as print dialog menu 36, configured to display to the user of computing device 28 various attributes affecting print job 38. As shown in FIG. 4, print dialog menu 36 typically includes a plurality of property sheets 38, accessible via selectors such as tabs. The property sheets display general attributes 40 of print job 38 common to all printing devices, such as the number of copies, or the page range of the document to be printed. The user may adjust values for these attributes via selectors 42. The property sheets further include user-adjustable printer-specific attributes 44, such as user-adjustable base attributes 46, and user-adjustable extended attributes 50. User-adjustable base attributes 46 are typically adjustable by a user via selector 48, while user-adjustable extended attributes 50 are typically adjustable via selector 52. It will be understood that user-adjustable base attributes 46 and user-adjustable extended attributes 50 are subsets of base attributes 16 and extended attributes 18, respectively, since not all of base attributes 16 and extended attributes 18 are typically adjustable by a user.

For example, user-adjustable base attributes 46 may include a user-adjustable resolution setting that may be set to 300 or 600 dots per inch (dpi). Base attributes 16 may further include associated non-user-adjustable printer instructions regarding how to render graphics at the 300 and 600 dpi settings. In addition, the user-adjustable extended attributes 50 may include a 1200 dpi setting, and extended attributes 18 may further include non-user-adjustable printer instructions for rendering graphics at the 1200 dpi setting. User-adjustable base attributes 46 may further include an "econo-mode" in which the printer may conserves energy, toner, and paper. Base attributes 18 typically include associated non-user-adjustable print instructions for printing in econo-mode. In addition, user-adjustable extended attributes 50 may include the lamination setting discussed above, and extended attributes 18 may include associated non-user-adjustable printer instruction for laminating a printed page. Further, user-adjustable extended attributes 50 may include a binding setting and the extended attributes may include associated non-user-adjustable instructions used in selectively causing the printing device to bind a document.

Print driver 22 is typically configured to process a print operation associated with the extended printing device 12 by selecting either or both of the base module 24 and/or the extended module 26 to perform the print operation. As used herein, the term "print operation" is used to mean virtually any process involved in printing a document to a printing device. Thus, the term is not limited to actually printing the document, but also includes adjusting settings of the printing device, pre-rendering images for printing, etc.

To select either or both of the base module and/or the extended module for processing a print operation, the print driver typically includes an interface module 54 configured to moderate communication between application programming interface 32, base module 24, and extended module 26. The interface module 54 is configured to select one or both of base module 24 and extended module 26 to perform a function related to the print operation. Typically, interface module 54 includes a decision mechanism 90, such as a mapping of functions to associated modules assigned to process each function. Within each of the base and extended modules, a plurality of base functions 25 or extended functions 27 (respectively) are provided to process the function calls from interface module 54. Functions 25, 27 are typically organized into function libraries, discussed below.

Figure 5:
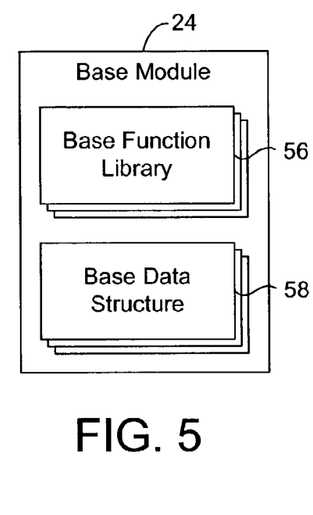
FIG. 5 is a schematic view of a base module according to an embodiment of the present invention of the printing system of FIG. 2.
Figure 6:
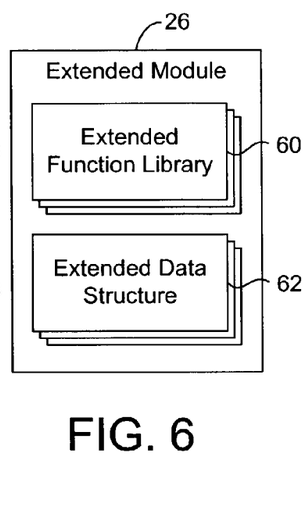
FIG. 6 is a schematic view of an extended module according to an embodiment of the present invention of the printing system of FIG. 2.
Figure 7:
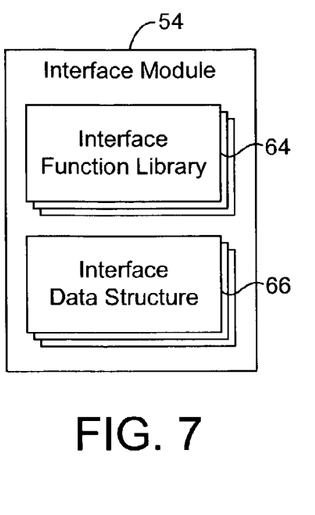
FIG. 7 is a schematic view of an interface module according to an embodiment of the present invention of the printing system of FIG. 2.
Figure 8:
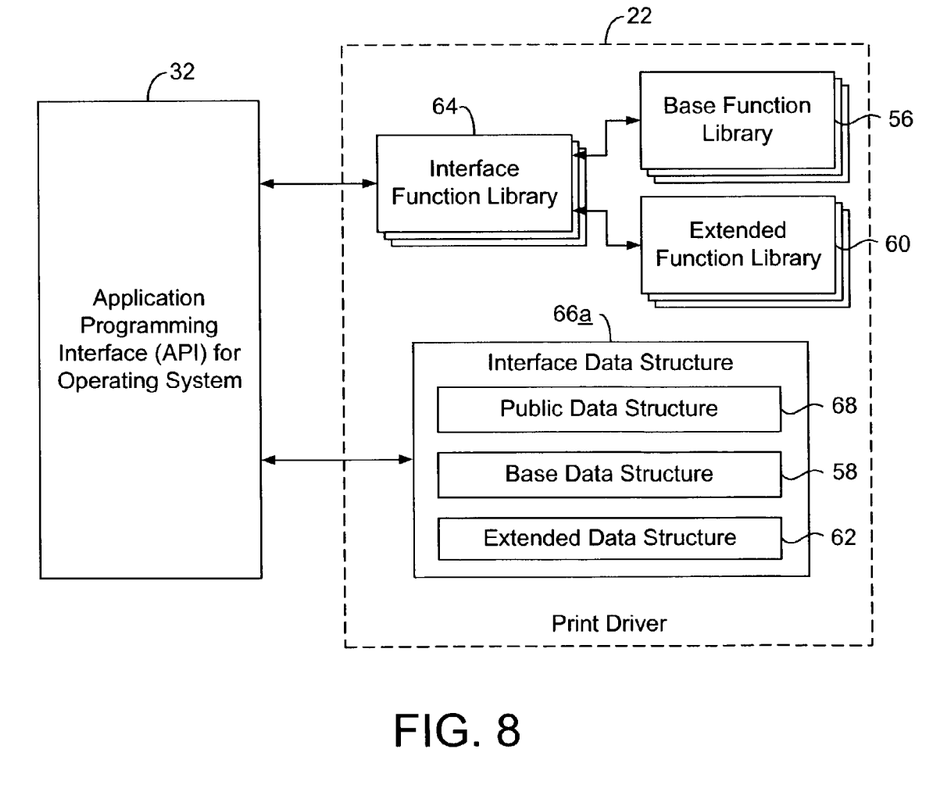
FIG. 8 is a detailed schematic view showing the interaction between an application programming interface and a print driver according to an embodiment of the present invention of the printing system of FIG. 2.

As shown in FIGS. 5–7, each of base module 24, extended module 26, and interface module 54 typically includes respective function libraries and data structures, including base function libraries 56, base data structures 58, extended function libraries 60, extended data structures 62, interface function libraries 64, and interface data structures 66. As shown in FIG. 8, typically the interface function libraries moderate communication between the API and the base function libraries 56 and extended function libraries 60, receiving print-operation related function calls from the API and determining whether one or both of the base and/or extended function libraries should process the function call. Responses from the base and extended function libraries are typically passed back to the API through the interface libraries.

The interface data structures 66 may be accessed either by the base and extended function libraries, or by the API directly. Typically, at least one of the interface data structures 66*a* includes a public portion including a public data structure 68, as well as a private portion including base data structure 58 and extended data structure 62. The base data structure typically defines variables, and contains data useful to accomplish a function related to a base attribute, for example, rendering data at 300 dpi on printing device 12.

The extended data structure typically defines variables and contains data useful to accomplish a function related to an extended attribute, for example, lamination of printed pages. Thus, the extended data structure may define a variable corresponding to the thickness or type of the laminate material, or the temperature or speed at which to run the laminate through a heat element of the extended printing device. According to an embodiment of the present invention in which the extended printing device 12 is a CD printer, the extended data structure may include data defining size and shape of the printable area of a compact disc, for example.

Figure 9:
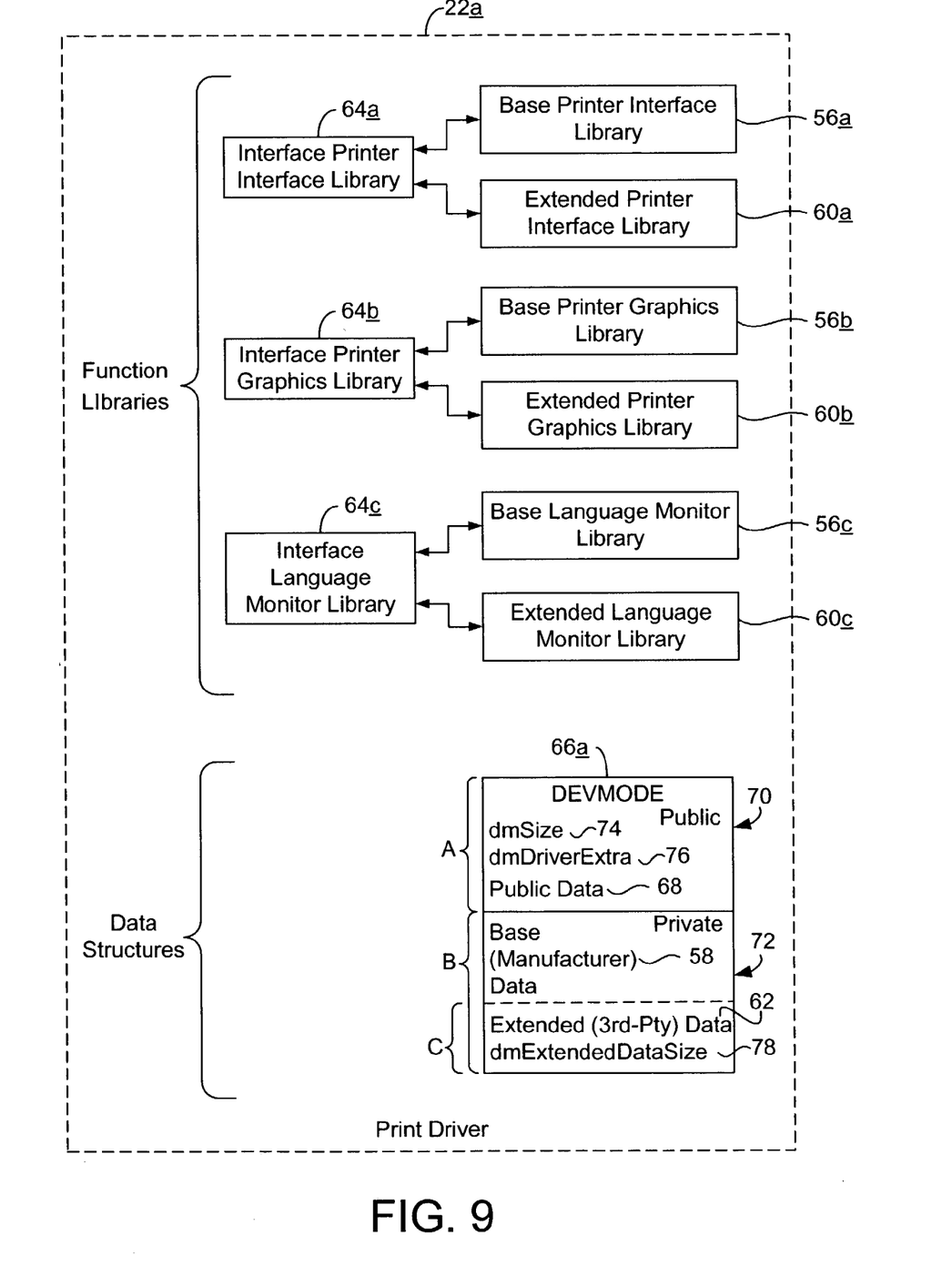
FIG. 9 is a schematic view of the components of a print driver of the printing system of FIG. 2 tailored for the Microsoft® Windows operating system, according to one embodiment of the present invention.

FIG. 9 illustrates one embodiment of a print driver 22*a* for use in the Microsoft® Windows operating system. Print driver 22*a* includes a plurality of printer interface libraries, which are configured to enable API 32 to interface with the printer-specific attributes of extended printing device 12, for example, by converting the API commands into printer-specific commands and settings. Among other functions, the print interface libraries are utilized by the API to display print dialog menu 36, discussed above. The printer interface libraries of print driver 22*a* typically include an interface printer interface library 64*a*, a base printer interface library 56*a*, and an extended printer interface library 60*a*. To display the print dialog menu 36, the API typically calls the interface printer interface library, which in turn calls base printer interface library 56*a* for functions related to the display and adjustment of base attributes 46, and calls the extended printer interface library 60*a* for functions related to the display and adjustment of extended attributes 50.

Print driver 22*a* also typically includes a plurality of printer graphics libraries, which are configured to work in conjunction with API 32 and perform print operations related to rendering graphics on extended printing device 12. The printer graphics libraries typically include an interface printer graphics library 64*b*, a base printer graphics library 56*b*, and an extended printer graphics library 60*b*. In response to graphics-related function calls from API 32, interface library is configured to determine whether the call will be handled by library 56*b* or 60*b*, or both. Typically, base printer graphics library 56*b* is configured to process graphics-related print operations that involve base attributes 16, while extended printer graphics library 60 is configured to process graphics-related print operations that involve extended attributes 18. For example, base printer graphics library may include routines for printing at 600 dpi, while extended printer graphics library may include routines for printing on plastic laminated surfaces, or at 1200 dpi. According to another embodiment in which the extended printing device is a CD printer, the extended printer graphics library may contain a mask function configured to cut and/or shape a print job to print on the printable area of a compact disc.

Print driver 22*a* also typically includes a plurality of language monitor libraries, which are configured to receive a data stream directed to the printer from a spooler's print processor, shown in FIG. 8. The language monitor libraries modify the data stream and pass it to the printer's port monitor, which in turn passes it to the port driver for the port to which the extended printing device is connected. One type of language monitor writes printer job language (PJL) commands into the data stream and reads responses out of the data stream, in order to enable bidirectional communication between the extended printing device 12 and the computing device 28. To enable the extended printing device 12 to include its own customized language monitor while at the same time taking advantage of the language monitor associated with base printing device 5*d*, print driver 22*a* typically is equipped with a base language monitor library 56*c* and an extended language monitor library 60*c*, described in detail below.

Print driver 22*a* further includes an interface data structure 66 taking the form of a modified DEVMODE data structure 66*a* of the Microsoft® Windows operating system. The DEVMODE data structure contains information about the device initialization and environment of a printing device. The modified DEVMODE data structure 66*a* includes a public portion 70 containing public data structure 68 and a private portion 72 containing private data structures including base data structure 58 and extended data structure 60. Public portion 70 typically includes a dmSize variable 74 indicating the size A of the public portion of the modified DEVMODE data structure. Public portion 70 also includes a dmDriverExtra variable 76 indicating the size B of the private portion of the modified DEVMODE data structure, which contains both the base and extended data structures 58, 62. Private portion 72 also typically includes a dmExtendedDataSize variable 78 indicating the size C of the extended data structure 62. It should be appreciated that the definition of the variables of the base data structure is distributed to the third party manufacturer only in object code, and thus the internal structure of the base data structure 58 is not known to the third party manufacturer. The third party manufacturer's components access the base data structure and its variables only via base function libraries.

Typically, the base printer interface library 56*a* is configured to access the public portion 70 of modified DEVMODE data structure 66*a*, as well as the base data structure 58 of the private portion 72. The extended printer interface library 60*a* is typically configured to receive modified DEVMODE data structure 66*a* to determine the size of the extended data structure 62 from the dmThirdPartyDataSize variable 78, and to access the extended data structure 62, which immediately follows the end of the base data structure 58 within modified DEVMODE structure 66*a*.

Figure 10:
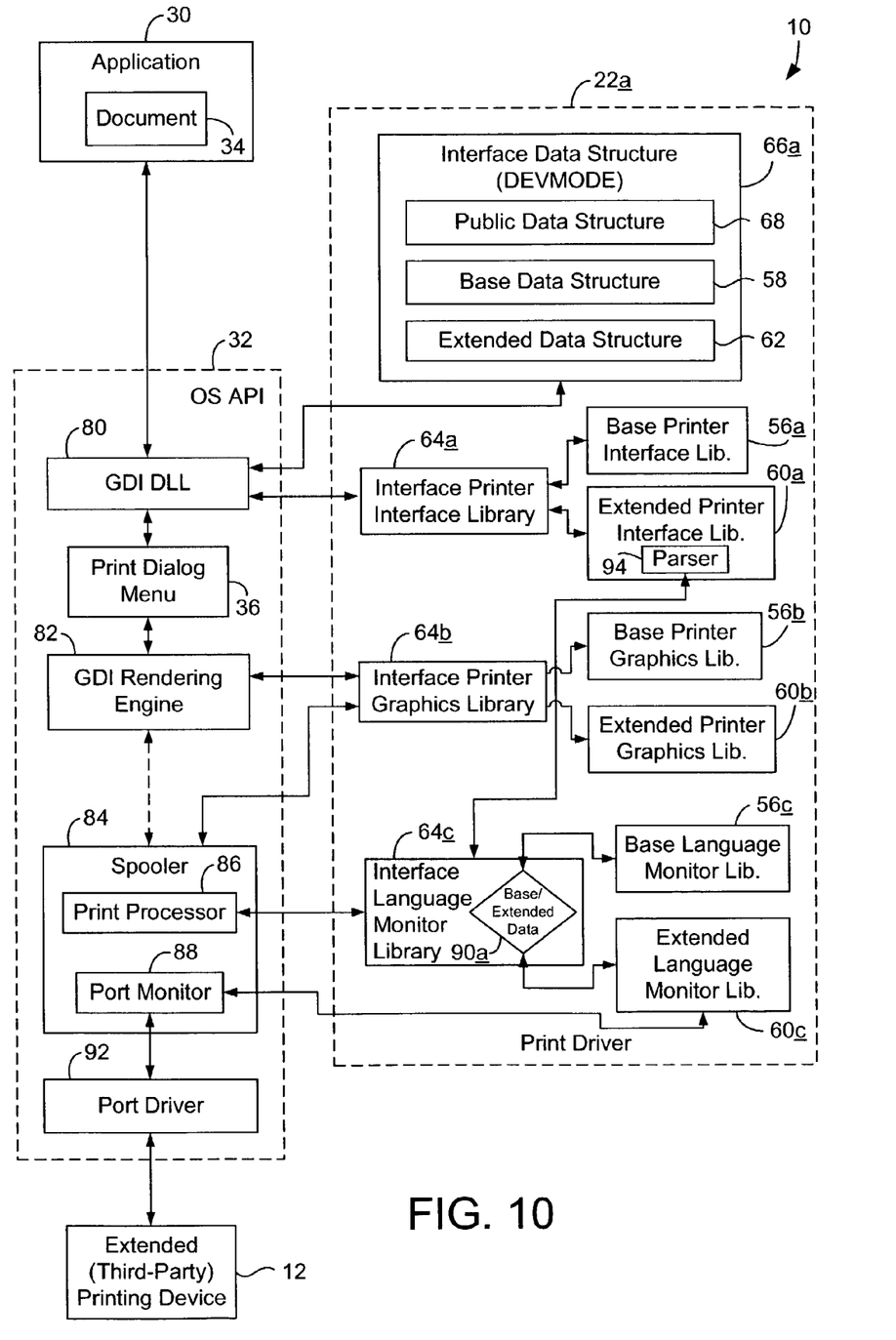
FIG. 10 is a schematic view of another embodiment of the printing system of FIG. 2, showing the data flow between the application, print driver, and an application programming interface of the Microsoft® Windows operating system.

FIG. 10 illustrates the manner in which print driver 22*a* interacts with the Microsoft® Windows operating system. In response to a user command to print a document 34, application 30 calls Graphics Development Interface (GDI) Dynamic Link Library (DLL) 80, or simply "GDI." The GDI provides functions and related structures that an application can use to generate graphical output for printing devices. Typically, application 30 sends output to extended printing device 12 by creating a device context for the extended printing device. The device context is a data structure managed by the GDI, which contains information about the extended device, such as its operating modes and current selections, etc. The device context is most often obtained by causing the GDI to produce a print dialog menu 36, which returns a device context to a GDI client after the user has adjusted the base and extended attributes described above. The GDI creates the print dialog menu by accessing the DEVMODE 66*a*, and printer interface library components 64*a*, 56*a*, 60*a*, as described above.

Once the device context is obtained from the print dialog menu, the GDI then calls a GDI rendering engine 82 to render the print job. GDI rendering engine 82 may render the print job itself, and send the data stream directly to a spooler 84. Or instead, the GDI rendering engine may utilize printer graphics library components 64*b*, 56*b*, 60*b*, to render the print job and send the output to spooler 84. As discussed above, interface printer graphics library 64*b* is configured to read the data stream and detect which commands and data should be processed by base printer graphics library 56*b*, and which commands should be processed by extended printer graphics library 60*b*.

Spooler 84 receives the output of the printer graphics library as a spool file, and performs necessary print processing via print processor 86. Print processor 86 includes a function library that is responsible for converting spooled data for a print job into a format that can be sent to port monitor 88. Print processor 86 is also responsible, for example, for handling a request from application 30 to pause, resume and cancel print jobs. Language monitor library components 64*c*, 56*c*, 60*c*, may be used to monitor data streaming through the print processor 86, and to modify the data stream and pass it to the printer's port monitor 88, which in turn passes it to the port driver 92 for the port to which the extended printing device 12 is connected. These language monitor library components may simply be referred to as "language monitors."

Spooler 84 typically makes function calls to the interface language monitor 64*c*, which in turn makes the same function calls to each of the base language monitor 56*c* and the extended language monitor 60*c*. As it receives each function call from interface language monitor 64*c*, extended language monitor 60*c* typically determines whether the base language monitor's responses should be executed, ignored, or whether an error should be reported, as discussed in the example below, and communicates the same to interface language monitor 64*c*. If the base language monitor's responses should be executed, the interface language monitor 64*c* passes the responses back to the API 32 or otherwise causes the responses to be executed. If the base language monitor's response is to be ignored, then interface language monitor 64*c* simply ignores the base language monitor's response. If an error is reported, for example, due to a conflict between the operations of the base and extended language monitors, then interface language monitor 64*c* typically instructs one of the base or extended language monitors (typically base language monitor 56*c*) to hold processing temporarily. The output of extended language monitor 60*c* may be sent to the port monitor 88. The output of the base language monitor 56*c* may be sent to the port monitor either via interface monitor 64*c*, or via extended language monitor 60*c*.

As discussed above, one type of language monitor writes printer job language (PJL) commands into the data stream and reads responses out of the data stream, in order to enable bi-directional communication between the extended printing device and the computing device. One exemplary function that the language monitor may be used to achieve is the lamination of a page of data after it is printed. At the language monitor level, print jobs do not have information that indicates when a page of a multi-page document is finished printing. This information would be useful where the extended printing device 12 is configured to treat the page, by lamination, etc.

To overcome this limitation, a PASSTHROUGH command is implemented in the present extended language monitor library 60*c*. The extended language monitor is configured to recognize the received from printing device 12 and to send an appropriate command to printing device 12, instructing the device to begin laminating the page.

The language monitor components interact to write data to the port monitor as follows. First, the spooler calls a WritePort command of interface language monitor library 64*c*. Next, interface language monitor 64*c* calls a PreWrite-Port function of the extended printer interface library 60*a*, which causes a parser 94 of the extended printer interface library 60*a* to parse a buffer that was sent to it by the spooler 84 so as to check whether a predetermined token exists in the buffer. If the token is found, then the extended printer interface library 60*a* returns an EXECUTE signal. If an EXECUTE signal is returned, and a decision mechanism 90*a* in the interface language monitor determines that the data should be processed by the base language monitor 56*c*, then the base language monitor 56*c* is instructed to read the data stream and process the language monitor-specific commands and data stored therein. If the extended printer interface library 60*a* returns either IGNORE or ERROR signals, and the decision mechanism 90*a* determines that the base language monitor library 56*c* should process the commands, then the base language monitor 56*c* will wait to complete the process, because the extended language monitor will assume that the extended language monitor is engaged in performing a conflicting process at the time. In this way, conflict between the base and extended language monitor processes may be avoided.

Figure 11:
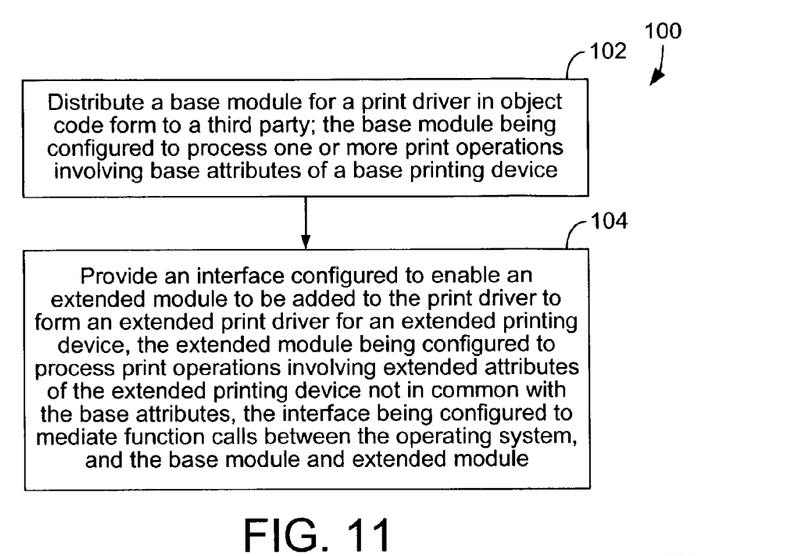
FIG. 11 is a flowchart of a method according to one embodiment of the present invention.

FIG. 11 shows a method of distributing a print driver for use with an operating system, according to one embodiment of the present invention generally at 100. Method 100 typically includes, at 102, distributing a base module for the print driver in object code form to a third party; the base module being configured to process one or more print operations involving, base attributes of a base printing device. At 104, the method includes providing an interface configured to enable an extended module to be added to the print driver to form an extended print driver for an extended printing device. Typically, the extended module is configured to process print operations involving extended attributes of the extended printing device not in common with the base attributes. Further, the interface typically is configured to mediate function calls between the operating system, and the base module and extended module.

Figure 12:
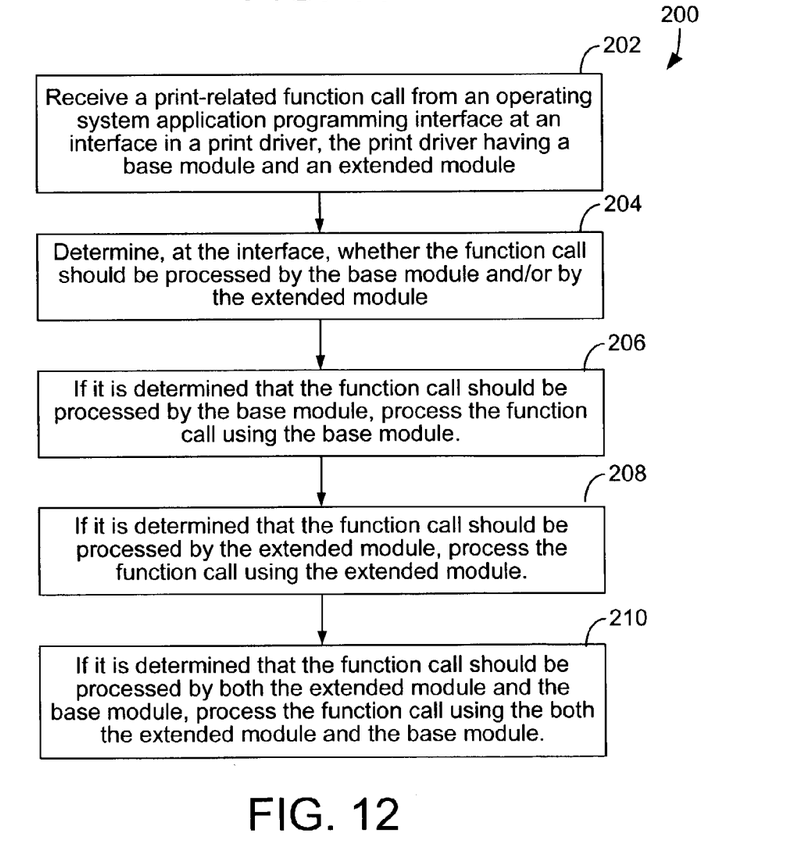
FIG. 12 is a flowchart of a method according to another embodiment of the present invention.

FIG. 12 shows a method 200 for printing a document with a print driver, according to another embodiment of the present invention. Method 200 typically includes, at 202, receiving a print-related function call from an operating system application programming interface at an interface in a print driver, the print driver having a base module and an extended module. At 204, the method typically includes determining, at the interface, whether the function call should be processed by the base module and/or by the extended module.

At 206, the method includes, if it is determined that the function call should be processed by the base module, processing the function call using the base module. At 208, the method includes, if it is determined that the function call should be processed by the extended module, processing the function call using the extended module. At 210, the method includes, if it is determined that the function call should be processed by both the extended module and the base module, processing the function call using the both the extended module and the base module.

The function call may be made to a printer interface library of the print driver, where the printer interface library includes an interface printer interface library, a base printer interface library and an extended printer interface library, as described above. Thus, the method may further include receiving the function call at an interface printer interface library of the print driver, determining whether the function call should be processed by a base printer interface library, an extended printer interface library, or both, and processing the function call using the appropriate library or libraries.

In addition, the function call may be made to a printer graphics library of the print driver, where the printer graphics library includes an interface printer graphics library, a base printer graphics library and an extended printer graphics library, as described above. Thus, the method may further comprise receiving the function call at an interface printer graphics library of the print driver, determining whether the function call should be processed by a base printer graphics library, an extended printer graphics library, or both, and processing the function call using the appropriate library or libraries.

Finally, the print-related function call may be made between a spooler and an interface language monitor library of the print driver, where the interface library is configured to moderate communications between the spooler and the base and extended language monitor libraries. Thus, the method may further include monitoring a data stream directed to the extended printing device from a spooler using a plurality of language monitor libraries, and modifying the data stream, via the language monitor libraries, to include printer-specific commands. The method may further include monitoring the data stream from the spooler at the interface language monitor library, at least in part by parsing the data stream using a parser of a printer interface library of the print driver and detecting predetermined commands and data therein. The method may further include determining whether to process associated function calls for the predetermined commands and data using the base language monitor library, the extended language monitor library, or both. In addition, as described above, the method may additionally include detecting whether there is a conflict between two or more function calls to be processed by the base language monitor library and extended language monitor library, and if so, delaying processing of one of the function calls.

The above described embodiments may be used to provide third parties, such as original equipment manufacturers, with the ability to utilize proprietary portions of a manufacturer's print driver in a customized print driver having custom functionality created by the third party, without disclosing the proprietary secrets of the manufacturer, thereby avoiding the problem of time consuming and costly development of print drivers associated with the prior art.

Although the invention has been disclosed in its preferred forms, the specific embodiments thereof as disclosed and illustrated herein are not to be considered in a limiting sense, because numerous variations are possible. The subject matter of the invention includes all novel and non-obvious combinations and subcombinations of the various elements, features, functions, and/or properties disclosed herein. Embodiments of the invention may comprise a computer-readable medium containing a print driver stored thereon.

What is claimed is:

1. A computer-readable medium comprising a print driver for use in printing a document from a computing device to an extended printing device, the extended printing device being based upon a base printing device, the print driver comprising:

a base module configured to process at least one base print operation involving printer-specific attributes of the extended printing device that are shared with the base printing device; and an interface module configured to enable an extended module to be added to the print driver to process at least one extended print operation involving printer-specific attributes of the extended printing device that are not shared with the base printing device; and a plurality of printer interface libraries configured to provide user interface for adjusting print attributes of a print job;

wherein the printer interface libraries include an interface printer interface library, a base printer interface library included in the base module, and an extended printer interface library included in the extended module, the interface printer interface library being configured to receive function calls related to a print operation from an application programming interface of the computing device, and configured to process the function calls using at least one of the base printer interface library and the extended printer interface library.

2. A computer-readable medium comprising a print driver for use in printing a document from a computing device to an extended printing device, the extended printing device being based upon a base printing device, the print driver comprising:

a base module configured to process at least one base print operation involving printer-specific attributes of the extended printing device that are shared with the base printing device; and an interface module configured to enable an extended module to be added to the print driver to process at least one extended print operation involving printer-specific attributes of the extended printing device that are not shared with the base printing device; and a plurality of printer graphics libraries configured to perform graphics rendering operations involved in printing a print job on the extended printing device;

wherein the printer graphics libraries include an interface printer graphics library, a base printer graphics library included in the base module, and an extended printer graphics library included in the extended module, the interface printer graphics library configured to receive function calls related to rendering graphics in the print job from an application programming interface of the computing device, and configured to process the function calls using at least one of the base printer graphics library and the extended printer graphics library.

3. A computer-readable medium comprising a print driver for use in printing a document from a computing device to an extended printing device, the extended printing device being based upon a base printing device, the print driver comprising:

a base module configured to process at least one base print operation involving printer-specific attributes of the extended printing device that are shared with the base printing device; and an interface module configured to enable an extended module to be added to the print driver to process at least one extended print operation involving printer-specific attributes of the extended printing device that are not shared with the base printing device; and a plurality of language monitor libraries configured to receive a data stream headed to the extended printing device from a spooler, and to modify the data stream to include printer-specific commands;

wherein the language monitor libraries include an interface language monitor library, a base language monitor library included in the base module, and an extended language monitor library included in the extended module, the interface language monitor library being configured to interact with a parser of a print interface library of the print driver to monitor the data stream from the spooler for predetermined commands and data, the interface language monitor having a decision mechanism for determining whether to process function calls related to the predetermined commands and data using at least one of the base language monitor library and the extended printer language monitor library.

4. The computer-readable medium of claim 3, wherein the interface language monitor is configured to delay processing of a base language monitor command by the base language monitor function library when an extended language monitor command is currently being processed by the extended language monitor library.

5. A method for use in printing a document with a print driver, the method comprising:

receiving a print-related function call from an operating system application programming interface at an interface module in a print driver, the print driver having a base module and an extended module; and determining, at the interface module, which at least one of the base module and the extended module should process the function call;

wherein the function call is made to a printer interface library of the print driver, the printer interface library including an interface printer interface library, a base printer interface library and an extended printer interface library, the method further comprising:

receiving the function call at an interface printer interface library of the print driver;

determining whether the function call should be processed by a base printer interface library, an extended printer interface library, or both; and processing the function call using the appropriate library or libraries.

6. A method for use in printing a document with a print driver, the method comprising:

receiving a print-related function call from an operating system application programming interface at an interface module in a print driver, the print driver having a base module and an extended module; and determining, at the interface module, which at least one of the base module and the extended module should process the function call;

wherein the function call is made to a printer graphics library of the print driver, the printer graphics library including an interface printer graphics library, a base printer graphics library and an extended printer graphics library, the method further comprising:

receiving the function call at an interface printer graphics library of the print driver;

determining whether the function call should be processed by a base printer graphics library, an extended printer graphics library, or both; and processing the function call using the appropriate library or libraries.

7. A method for use in printing a document with a print driver, the method comprising:

receiving a print-related function call from an operating system application programming interface at an interface module in a print driver, the print driver having a base module and an extended module;

determining, at the interface module, which at least one of the base module and the extended module should process the function call;

monitoring a data stream representative of the document directed to an extended printing device using a plurality of language monitor libraries; and modifying the data stream with the language monitor libraries so as to include commands specific to the extended printing device wherein the language monitor libraries include an interface language monitor library, a base language monitor library included in the base module, and an extended language monitor library included in the extended module, the method further comprising:

monitoring the data stream at the interface language monitor, at least in part by parsing the data stream using a parser of a printer interface library of the print driver and detecting predetermined commands and data therein; and determining which at least one of the base language monitor library and the extended language monitor library should process the function calls for the predetermined commands and data.

8. The method of claim 7, further comprising:

detecting whether there is a conflict between two or more function calls to be processed by the base language monitor library and extended language monitor library, and if so, delaying processing of one of the function calls.

9. A printing system, comprising:

an extended printing device based upon a base printing device, the extended printing device having printer-specific attributes including base attributes shared with the base printing device, and extended attributes not shared with the base printing device; and a print driver for the extended printing device, the print driver including a base module configured to process one or more print operations involving the base attributes, and an extended module configured to process one or more print operations involving the extended attributes;

wherein the extended printing device further includes dual attributes, and the base module and the extended module are both configured to process at least one print operation involving the dual attributes.

* * * * *